June 10, 1958     D. M. ADAMS ET AL     2,837,758

WINDSHIELD WIPER TRANSMISSION

Filed June 16, 1954

INVENTORS
DANIEL M. ADAMS
CHARLES P. ROTH
BY   Craig V. Morton
THEIR ATTORNEY

United States Patent Office 2,837,758
Patented June 10, 1958

2,837,758

WINDSHIELD WIPER TRANSMISSION

Daniel M. Adams, Birmingham, and Charles P. Roth, Dearborn, Mich., assignors to General Motors Corporation, Detroit, Mich., a corporation of Delaware Application June 16, 1954, Serial No. 437,084

4 Claims. (Cl. 15—253)

This invention pertains to windshield wiper transmissions, and particularly to an improved cable transmission disposed between the actuating mechanism and the wiper shafts.

Cable transmissions in windshield wiper apparatus have become a necessity due to the configuration of the cowl section of present day vehicles. The present invention seeks to obviate the difficulties encountered with cable transmissions due to excessive free play, as well as appreciably minimizing the problems encountered by reason of the variable load imposed upon the actuating mechanism due to the variable coefficient of friction between the blades and the vehicular transparency. In particular, this invention minimizes shrinkage of the wiping stroke which is caused by the aforementioned factors so as to insure that a substantially constant area will be wiped under all conditions. Accordingly, among our objects are the provision of wiper drive means which effect a substantially constant amplitude wiping stroke irrespective of the condition of the windshield and/or actuating mechanism; the further provision of a cable transmission for windshield wipers including means for minimizing shrinkage of the wiping stroke; the further provision of positive stop means for use with a windshield wiper cable transmission; and the still further provision of auxiliary cable tensioning means and shock absorber means for a cable transmission of the aforesaid character.

The aforementioned and other objects are accomplished in the present invention by increasing the wiping stroke of the actuating mechanism, and incorporating means in the transmission for positively limiting the wiping stroke under ideal conditions to an amplitude less than that produced by the actuating mechanism so as to maintain a substantially constant wiping stroke under all conditions. Specifically, in the disclosed embodiment, the wiping stroke is increased by increasing the diameter of the auxiliary driving mechanism which is operatively connected to the oscillatory shaft of the actuating mechanism, be it a suction, hydraulic, or electric motor. In addition, the cable transmission is modified to include stops which positively reduce the wiping stroke to an amplitude less than that capable of being effected by the actuating mechanism and the auxiliary driving mechanism. In this manner, the amplitude of oscillatory movement imparted to the wiper blades under all conditions will remain substantially constant.

As alluded to hereinbefore, it has been observed that the oscillatory stroke of wipers varies considerably, particularly on severely curved vehicular transparencies, commonly known as wrap around windshields. This "shrinkage" may be caused by variation in the available suction for actuating a suction motor; variation in the load imposed upon the motor due to the variable coefficient to friction between the blades and windshield; excessive free play in the drive apparatus; or a combination of all, or any, of the aforegoing. The present invention seeks to obviate these difficulties so as to insure that a substantially constant area of the transparency will be cleaned by the wipers during inclement weather under all conditions.

To achieve this result, the pulley spools connected with the wiper shafts carry adjustable stop lugs which are arranged to engage stationary stops that are attached to the wiper shaft supporting brackets. The pulley carried stop lugs are adjusted so that under ideal conditions, the wiping stroke is positively limited by engagement of the complementary stops. Thus, under the most adverse conditions, the wiping stroke will not be appreciably altered.

In order to absorb the shock to which the cable transmission and auxiliary driving mechanism are subjected by reason of the incorporation of positive stroke stops, the cables include shock absorbing means. Furthermore, in order to absorb "humping" of the cables due to the stroke limiting stops, the cables include auxiliary tensioning means. The shock absorbing means comprise a coil spring, connected between opposed ends of the cable, and an overload wire hook for preventing damage to the coil spring due to inadvertent manual movement of the wiper arms to an over-travel position. The auxiliary tensioning means comprises a coil type hair spring, opposite ends of which are hooked to the cable with a slight cable hump therebetween.

Further objects and advantages of the present invention will be apparent from the following description, reference being had to the accompanying drawing wherein a preferred embodiment of the present invention is clearly shown.

Figure 1:
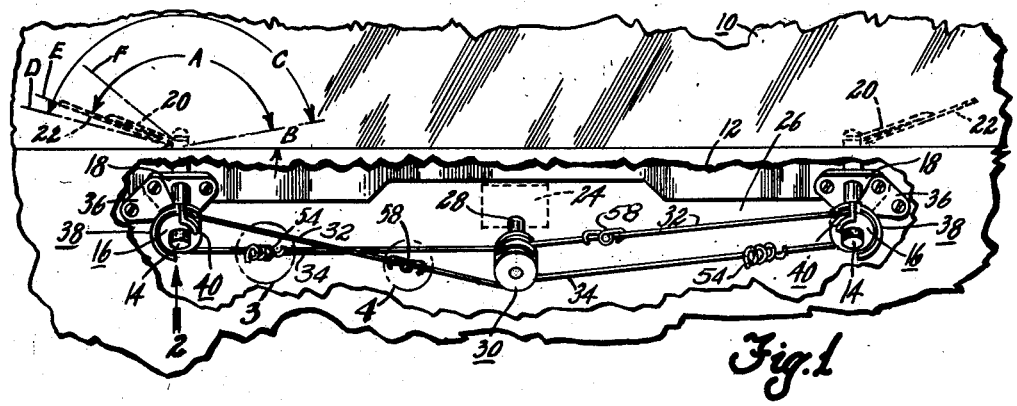
Fig. 1 is a fragmentary view, in elevation, of a portion of the dash panel and windshield of a vehicle, with parts broken away to show the improved windshield wiper transmission.
Figure 3:
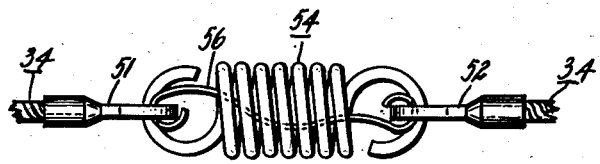
Figure 4:
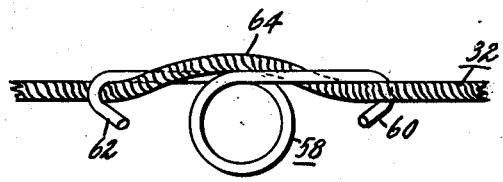

Figs. 3 and 4 are enlarged views, in elevation, taken within the area of circles 3 and 4, respectively, of Fig. 1.

With particular reference to Fig. 1 of the drawing, the improved cable transmission of this invention is shown incorporated in a vehicle having a windshield 10 which is positioned above a dash panel 12. According to conventional practice, the vehicle is equipped with two wipers disposed on opposite sides of the medial portion of the windshield and arranged to be operated in synchronism. Inasmuch as the wiping mechanism for each side of the windshield is identical, only one will be described in detail, duplicate parts of the other mechanism being designated by the same reference characters used to designate the mechanism described.

The wiping mechanism for each side of the windshield includes a shaft 14 which is rotatably connected to a driven pulley spool assembly 16, the shaft 14 being supported by a bearing, not shown, carried by a supporting bracket 18, which is attached by any suitable means, such as bolts, to the vehicle body. The shaft 14 projects through the vehicle body and has attached thereto a wiper arm 20, the outer end of which is detachably connected to a wiper blade 22.

The wiping mechanism also includes a motor 24, which is mounted on the engine side of the firewall 26, which motor may be of the suction, hydraulic, or electric type. In any event, the motor is capable of imparting oscillatory movement to a driven shaft 28, which projects through the firewall 26, the shaft 28 being connected to a driving pulley assembly 30 constituting a part of the auxiliary driving mechanism. The auxiliary driving mechanism may be of the type disclosed in the Horton Patent 2,561,801.

The driving pulley assembly 30 has trained thereabout a flexible cable transmission comprising an upper cable 32 and a lower cable 34, the cables 32 and 34 extending between the driving pulley assembly 30 and the pulley spool assemblies 16 attached to the wiper shafts 14.

The actuating mechanism 24 is of the type capable of imparting oscillatory movement to the blades 22 through the transmission and auxiliary driving mechanism throughout a wiping stroke designated by the angle A, and is also capable of imparting oscillatory movement of greater amplitude to the wiper blade 22 so as to move the same throughout the angle $A+B$ to a parked position adjacent the cowl, or rail portion, of the motor vehicle, at which position the blade remains when the motor 24 is inactive. The cable transmission aforedescribed preferably includes primary cable tensioning means of the type disclosed in the McClelland Patent 2,660,894, which tensioning means are incorporated in and form a part of the driven pulley spool assemblies 16.

As alluded to hereinbefore, it has been observed that the oscillatory stroke of a wiper varies considerably during operation of the wiping mechanism. More specifically, the total area of the vehicular transparency which is cleaned by the wipers is erratic due to variations in the wiping strokes of the wiper blades, the area under consideration lying between lines E and F in Fig. 1. This phenomenon is known as "shrinkage," and may be caused by a number of factors. Thus, if the motor employed for actuating the wiping mechanism is of the suction type, variation in the available suction for actuating the motor will cause a corresponding variation in the amplitude of oscillatory movement imparted to the wiper blades. Furthermore, variation in the load imposed upon the motor due to the variable coefficient of friction between the blades and the windshield during different conditions of the windshield, such as wet, dry or tacky, will cause a variation in the amplitude of oscillation imparted to the wiper blade. In addition, excessive free play in the drive apparatus may cause a considerable variation in the amplitude of oscillation imparted to the wiper blades. This invention seeks to obviate these difficulties so as to assure a substantially constant wiping stroke under all conditions.

Figure 2:
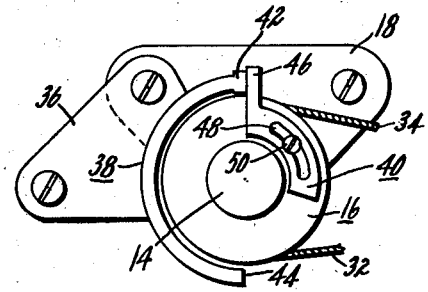
Fig. 2 is an enlarged view, in elevation, taken in the direction of arrow 2 of Fig. 1.

With particular reference to Figs. 1 and 2, the positive stop means for limiting the stroke of the wiper blades will be described. The bracket 18, which supports the wiper shaft 14, and the pulley spool assembly 16 has attached thereto a stop supporting bracket 36. The bracket 36 carries a stationary stop 38, which in the disclosed embodiments subtends an arc of substantially 180°. The semi-circular stationary stop 38 is radially spaced from the outer periphery of the pulley spool assembly 16. The pulley spool assembly 16 has been modified and incorporates an adjustable stop lug 40, which is arranged to engage the ends 42 and 44 of the stationary stop 38. The adjustable stop lug 40 is formed with an upstanding ear 46 arranged to abut the ends 42 and 44 of the stationary stop 38, and is also formed with a slot 48 through which a screw 50 may be inserted for connecting the stop lug 40 to the pulley spool assembly 16. The slot and screw connection of the stop lug 40 to the pulley 16 facilitates adjustment thereof so as to achieve the desired stroke stop.

In order to arrange the mechanism so that the wiping stroke of the blades 22 will remain substantially constant under all conditions, the amplitude of oscillatory movement capable of being imparted to the driven spool assembly 16 by the actuating mechanism is greater than that permitted by the position of the stops 40 and 38. The amplitude of oscillation imparted to the driven pulley assembly 16 may be varied in numerous ways, such as increasing the diameter of the driver pulley assembly 30, or increasing the oscillatory stroke of the motor 24. In any event, and with particular reference to Fig. 1, the actuating mechanism, including the motor 24 and the driver pulley assembly 30, is designed so that under ideal conditions, and in absence of the stop mechanism hereinbefore described, it will impart oscillation to the wiper blade 22 throughout an angle C during wiper operation. However, in the present invention, the adjustable stop 40 is positioned so that ear 46 abuts the end 42 of the stationary stop 38 so that under ideal conditions, the wiping stroke is limited to the angle A. Thus, whereas the actuating mechanism is capable of moving the blade 22 to the outboard position designated by line D, the positive stop arrangement will limit the outboard position to the line E. In this manner, the total stroke travel of the blades under all conditions will be substantially constant, since the normal shrinkage between lines E and F will be substantially eliminated.

As a typical example, it might be desirable to adjust the actuating mechanism so that the wiping stroke is capable of moving the tip end of the blade 22 sixty inches. However, the adjustable stop 40 is positioned so that under ideal conditions, the stroke is positively limited to fifty-eight inches, the two inches being removed from the outboard end of the stroke where the shrinkage is of the greatest importance due to impairment of the driver's range of vision.

It will be appreciated that by incorporating a positive stroke stop at the outboard end of the wiping stroke, the cable transmission and auxiliary driving mechanism will be subjected to shock due to engagement of the ear 46 with the end 42 of the stationary stop 38. Thus, the present invention also incorporates shock absorbing means in the lower cable 34. As shown in Fig. 3, the lower cable 34 is split and the opposed ends thereof have attached thereto eyelet members 51 and 52, respectively. Eyelet member 51 and eyelet member 52 are connected by a retraction coil spring 54, opposite ends of which are hooked through the eyelets. The spring 54 will effectively absorb the shock to which the transmission and auxiliary driving mechanism are subjected due to the engagement of the stop lug 40 with the stationary stop 38. In addition, an overload wire hook 56 has opposite ends loosely attached to the eyelets 51 and 52, the hook extending through the center of the coil spring 54. The function of the hook 56 is to prevent damage to the spring 54, which might otherwise occur to the spring 54 when the wiper arms 20 are subjected to misuse, such as manually moving them to an over-travel position.

It will also be appreciated that due to the positive stroke stop at the outboard end of the wiping stroke, the cables 32 and 34 will tend to hump inasmuch as the driving pulley assembly 30 imparts greater movement to the cables than is permitted by the driven pulley assembly 16. To absorb humping of the cables 32 and 34, the upper cable 32 incorporates auxiliary tensioning means which are depicted in Fig. 4. The auxiliary tensioning means comprise a coil type hairpin spring 58, opposite ends, 60 and 62, of which are hooked around the cable 32. The intermediate portion 64 of the cable between the hooked ends 60 and 62 is slightly humped by the spring 58 so that upon engagement of the stop lug 40 and the stationary stop 38, the coil spring 58 will absorb humping of the upper cable 32 and maintain the requisite cable tension.

When the wiper blade 22 is moved to the parked position against the cowl portion of the motor vehicle, the stop lug 40 will engage the end 44 of the stationary stop 38. However, the adjustment of the stop lug 40 relative to the end 44 of the stationary stop 38 is not critical since shrinkage is not a problem in parking the wiper blades.

Operation of the improved windshield wiper transmission is believed to be readily apparent from the preceding description. Suffice it to say with the cable transmission of this invention, the wiping stroke of the wiper blades remains substantially constant irrespective of the amount of free play in the transmission and the variable coefficient of friction between the wiper blades and the windshield surface. Furthermore, if a suction motor is employed as the actuating mechanism, variation in the motor stroke due to variations in available suction will not appreciably affect the stroke of the wiper blades.

While the embodiment of the present invention as herein disclosed, constitutes a preferred form, it is to be understood that other forms might be adopted.

What is claimed is as follows:

1. Windshield wiper drive apparatus including, a power unit having an oscillatory output member with a stroke of predetermined amplitude, a wiper, a shaft for oscillating the wiper, a pulley assembly attached to the wiper shaft, a flexible cable drive interconnecting the output member and the pulley assembly including a pair of flexible cables and primary tensioning means therefor, a stationary bracket having an arcuate stop encircling a portion of the pulley assembly, a complementary stop attached to said pulley assembly and engageable with said arcuate stop for positively limiting the oscillation of said wiper to an amplitude less than the predetermined amplitude of the output member, resilient means in one of said cables for taking up the extra movement of said output member, and auxiliary tensioning means in the other flexible cable for preventing humping thereof due to engagement between the arcuate stop and the pulley assembly stop.

2. A windshield cleaning system including, a power unit, a wiper, a wiper actuating cable transmission unit having primary cable tensioning means, said power unit being capable of imparting oscillation of a predetermined amplitude to the wiper, said wiper including a shaft, said power unit including a driving pulley assembly, said transmission unit including a driven pulley assembly operatively connected to said wiper shaft, and a pair of flexible cables extending between said driving and driven pulley assemblies, and stop means operatively associated with said driven pulley assembly for positively limiting the oscillation of said wiper to an amplitude less than the predetermined amplitude of said power unit, one of said cables including resilient means for absorbing the extra movement of said power unit whereby the oscillatory amplitude of said wiper will remain substantially constant under all conditions, said stop means including a stationary stop disposed adjacent the periphery of said driven pulley assembly and an adjustable stop attached to and rotatable with said driven pulley assembly, said adjustable stop being arranged to engage said stationary stop.

3. A windshield cleaning system including, a power unit, a wiper, a wiper actuating cable transmission unit having primary cable tensioning means, said power unit being capable of imparting oscillation of a predetermined amplitude to the wiper, said wiper including a shaft, said power unit including a driving pulley assembly, said transmission unit including a driven pulley assembly operatively connected to said wiper shaft, and a pair of flexible cables extending between said driving and driven pulley assemblies, and stop means operatively associated with said driven pulley assembly for positively limiting the oscillation of said wiper to an amplitude less than the predetermined amplitude of said power unit, one of said cables including resilient means for absorbing the extra movement of said power unit whereby the oscillatory amplitude of said wiper will remain substantially constant under all conditions, said resilient means comprising a coil spring, opposite ends of which are attached to the ends of said one flexible cable, and a wire hook extending through the center of said coil spring, opposite ends of said hook being attached to the ends of said one flexible cable.

4. In a windshield wiper having power means including a driving pulley assembly, and a wiper, a wiper actuating cable transmission unit having primary cable tensioning means interconnecting said driving pulley assembly and said wiper including; a driven pulley assembly operatively connected to said wiper; a pair of flexible cables extending between said driving pulley assembly and said driven pulley assembly; a stationary stop member disposed adjacent the periphery of said driven pulley assembly; a complementary adjustable stop member attached to and movable with said driven pulley assembly, the arrangement being such that said stop members positively limit movement of said driven pulley assembly to an amplitude less than the movement of said driving pulley assembly; resilient means in one of said flexible cables for taking up the extra movement of said driving pulley assembly and limiting shock to the transmission unit and the power means due to engagement of said stop members; and auxiliary tensioning means in the other of said flexible cables for preventing humping thereof due to engagement of said stop members.

References Cited in the file of this patent

UNITED STATES PATENTS

| 2,538,344 | Wahlberg | Jan. 16, 1951 |
| 2,574,504 | Sivacek | Nov. 13, 1951 |
| 2,660,894 | McClelland | Dec. 1, 1953 |
| 2,744,282 | Dyer et al. | May 8, 1956 |
| 2,745,130 | Oishei | May 15, 1956 |

FOREIGN PATENTS

| 678,555 | France | Jan. 2, 1930 |